United States Patent
Uralsky et al.

(10) Patent No.: US 10,096,086 B2
(45) Date of Patent: Oct. 9, 2018

(54) ENHANCED ANTI-ALIASING BY VARYING SAMPLE PATTERNS SPATIALLY AND/OR TEMPORALLY

(71) Applicant: NVIDIA CORPORATION, Santa Clara, CA (US)

(72) Inventors: Yury Y. Uralsky, Santa Clara, CA (US); Jonah M. Alben, San Jose, CA (US); Ankan Banerjee, Pune (IN); Gregory Massal, Pflugerville, TX (US); Thomas Petersen, San Jose, CA (US); Oleg Kuznetsov, Santa Clara, CA (US); Eric B. Lum, San Jose, CA (US); Prakshep Mehta, Pune (IN)

(73) Assignee: NVIDIA CORPORATION, Santa Clara, CA (US)

( * ) Notice: Subject to any disclaimer, the term of this patent is extended or adjusted under 35 U.S.C. 154(b) by 384 days.

(21) Appl. No.: 14/846,737

(22) Filed: Sep. 5, 2015

(65) Prior Publication Data
US 2016/0071242 A1 Mar. 10, 2016

Related U.S. Application Data

(60) Provisional application No. 62/048,751, filed on Sep. 10, 2014.

(51) Int. Cl.
*G06T 5/00* (2006.01)
*G06T 11/00* (2006.01)
(Continued)

(52) U.S. Cl.
CPC .................. *G06T 5/00* (2013.01); *G06T 1/20* (2013.01); *G06T 5/002* (2013.01); *G06T 5/20* (2013.01); *G06T 11/001* (2013.01); *G06T 2200/12* (2013.01); *G06T 2207/10016* (2013.01); *G06T 2207/10024* (2013.01); *G06T 2207/20182* (2013.01)

(58) Field of Classification Search
None
See application file for complete search history.

(56) References Cited

U.S. PATENT DOCUMENTS 6,720,975 B1  4/2004 Dietrich, Jr.
6,999,100 B1  2/2006 Leather et al.
(Continued)

FOREIGN PATENT DOCUMENTS

CN  1748229 A  3/2006
CN  1809840 A  7/2006
(Continued)

*Primary Examiner* — Michelle Chin
(74) *Attorney, Agent, or Firm* — Artegis Law Group, LLP

(57) ABSTRACT

A raster unit is configured to generate different sample patterns for adjacent pixels within a given frame. In addition, the raster unit may adjust the sample patterns between frames. The raster unit includes an index unit that selects a sample pattern table for use with a current frame. For a given pixel, the index unit extracts a sample pattern from the selected sample pattern table. The extracted sample pattern is used to generate coverage information for the pixel. The coverage information for all pixels is then used to generate an image. The resultant image may then be filtered to reduce or remove artifacts induced by the changing of sample locations.

20 Claims, 19 Drawing Sheets

(51) Int. Cl.
    *G06T 1/20*         (2006.01)
    *G06T 5/20*         (2006.01)

(56)                  References Cited

U.S. PATENT DOCUMENTS

| | | |
|---|---|---|
| 7,446,780 B1 | 11/2008 | Everitt et al. |
| 8,731,254 B2 | 5/2014 | Nakao et al. |
| 2003/0214513 A1 | 11/2003 | Brown et al. |
| 2006/0061590 A1 | 3/2006 | Akenine-Moller et al. |
| 2007/0257935 A1* | 11/2007 | Koduri .................. G06F 3/14 345/611 |
| 2011/0090220 A1* | 4/2011 | Molnar ................ G06T 15/005 345/420 |

FOREIGN PATENT DOCUMENTS

| | | |
|---|---|---|
| CN | 101061517 A | 10/2007 |
| CN | 101620725 A | 1/2010 |
| EP | 1792281 A1 | 6/2007 |
| WO | 00/33256 A1 | 6/2000 |

\* cited by examiner

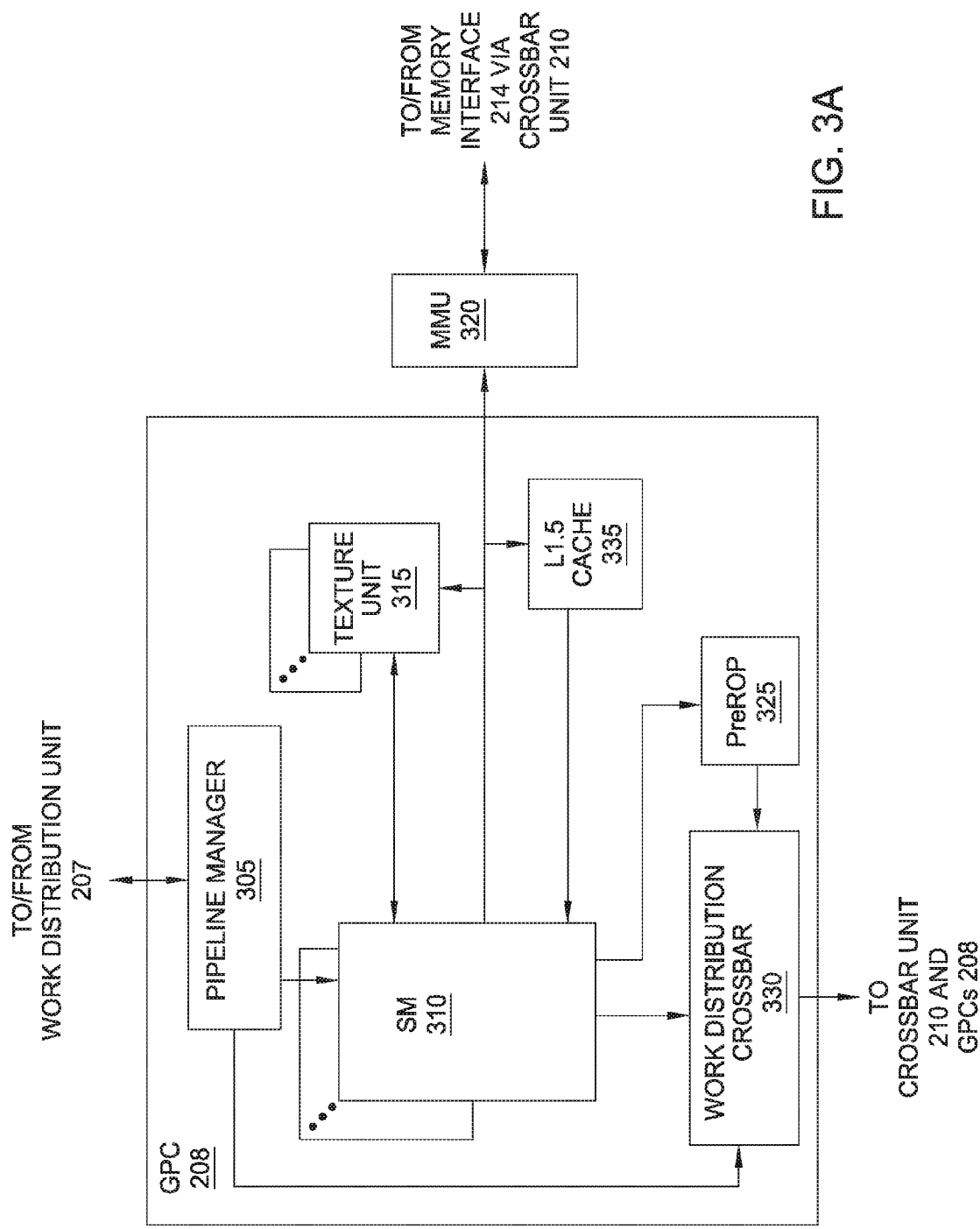

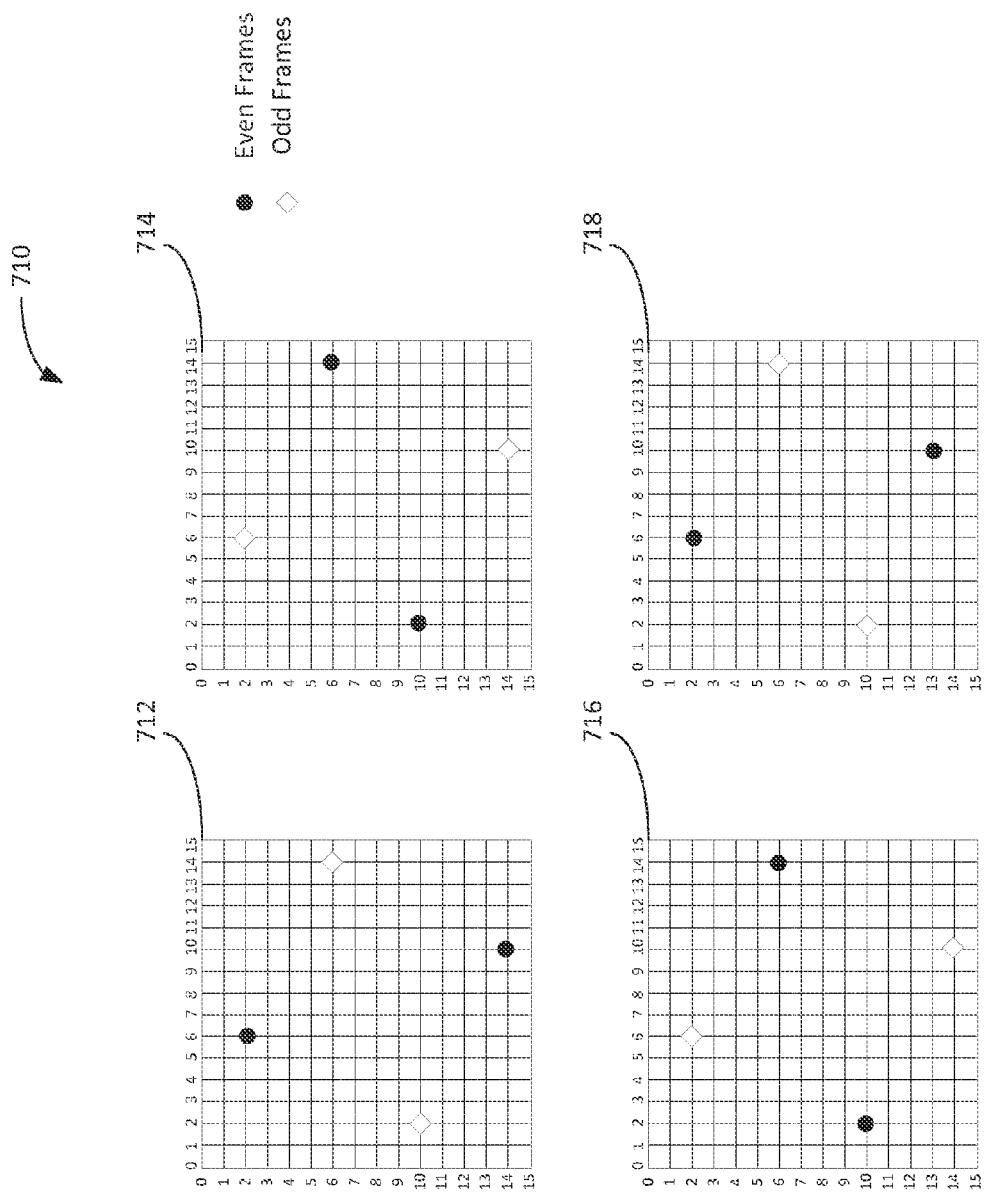

ENHANCED ANTI-ALIASING BY VARYING SAMPLE PATTERNS SPATIALLY AND/OR TEMPORALLY

CROSS-REFERENCE TO RELATED APPLICATIONS

This application claims the benefit of U.S. provisional patent application titled, "FILTERING TECHNIQUES TO REDUCE VISUAL ARTIFACTS," filed on Sep. 10, 2014 and having Ser. No. 62/048,751. The subject matter of this related application is hereby incorporated herein by reference.

BACKGROUND OF THE INVENTION

Field of the Invention

Embodiments of the present invention relate generally to graphics processing and, more particularly, to enhanced anti-aliasing by varying sample patterns spatially and/or temporally.

Description of the Related Art

In a graphics processing pipeline, the rasterizer is typically responsible for computing coverage information for pixels based on geometry associated with a graphics scene. For example, for a given pixel, the rasterizer could determine that a triangle in the graphics scene covers the pixel. The pixel may then be shaded, later in the pipeline, based on the color of the triangle. The rasterizer computes coverage information for a pixel by determining whether the geometry covers the pixel at one or more coverage sample locations within the pixel.

In a simple configuration, coverage is determined by testing whether geometry covers the center of the pixel, where the center of the pixel is used as the coverage sample location. However, this form of sampling can be inaccurate, especially for complex shapes. Accordingly, modern rasterizers oftentimes employ a multisampling approach, where coverage within the pixel is tested at multiple different coverage sample locations. The positions of the multiple samples are generally fixed coverage sample locations. The positions of the multiple samples are generally fixed and identical from pixel to pixel to reflect a specific sample pattern that has been empirically determined to yield accurate coverage information for a range of graphics scenes.

One drawback of the above approach is that the quality of images generated via conventional multisampling is dependent on the number of sample locations used per pixel. Consequently, to generate higher quality images, more sample locations must be implemented. However, these additional sample locations incur significant overhead. Specifically, additional frame buffer space must be allocated to accommodate color, z-data, and other types of information associated with the additional samples. In sum, the quality of images, as well as the requisite overhead, scales with the number of samples.

As the foregoing illustrates, what is needed in the art is a technique for increasing image quality without incurring the overhead associated with increasing the number of samples per pixel.

SUMMARY OF THE INVENTION

One embodiment of the present invention sets forth a graphics subsystem, including a first sample pattern table that includes a first plurality of entries, and an index unit configured to generate a first index into the first sample pattern table that references a first subset of entries included in the first plurality of entries, and extract the first subset of entries from the first sample pattern table, where a first entry included in the first subset of entries indicates a first location within a first pixel of a first frame where a first sample is to be generated.

At least one advantage of the disclosed technique is that with only N/M sample locations per pixel, N coverage samples may be generated across M frames, yielding an image having quality that appears consistent with N coverage samples per pixel.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A is a block diagram of a general processing cluster included in the parallel processing unit of FIG. 2, according to one embodiment of the present invention;

FIGS. 7A-7D illustrate exemplary sample patterns that may be generated by the raster unit of FIG. 5, according to various embodiments of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
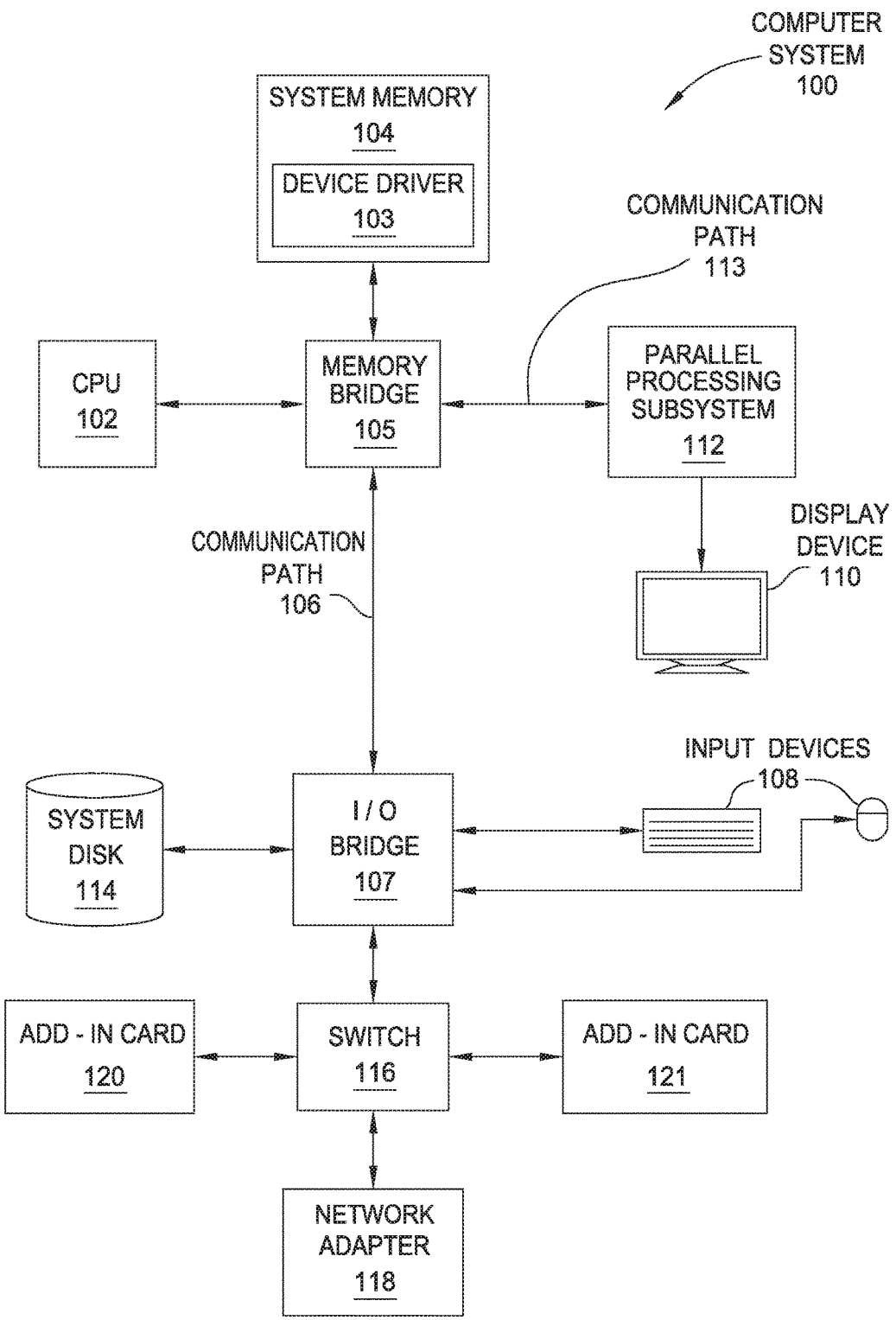
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to UO bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
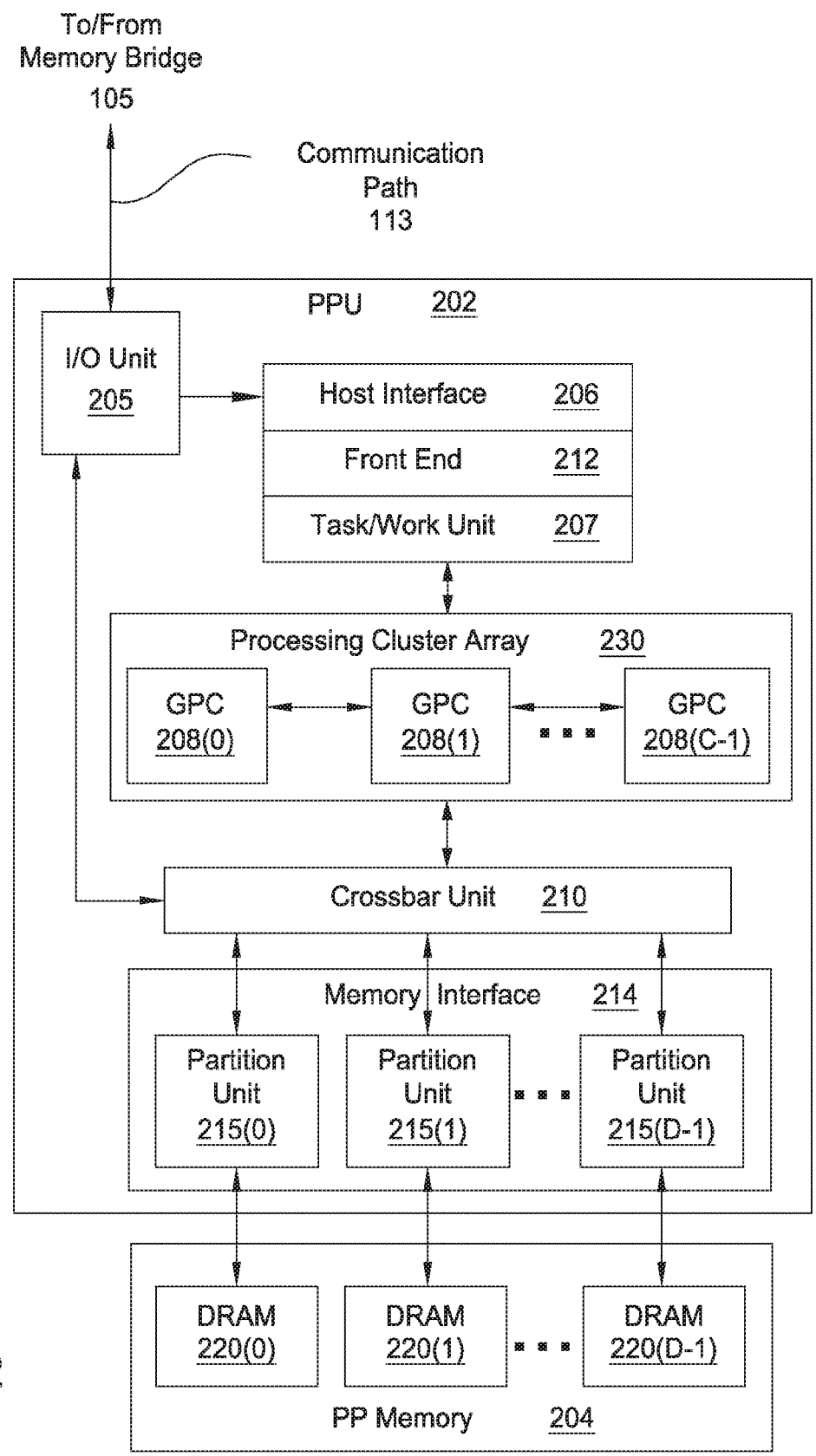
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or UO bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing dusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive dock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPO 208 and configured to receive and hold data requested from memory via memory interface 214 by SM 310. Such data may include, without limitation, instructions, uniform data, and constant data. In embodiments having multiple Skis 310 within GPO 208, the Skis 310 may beneficially share common instructions and data cached in L1.5 cache 335.

Each GPO 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPO 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
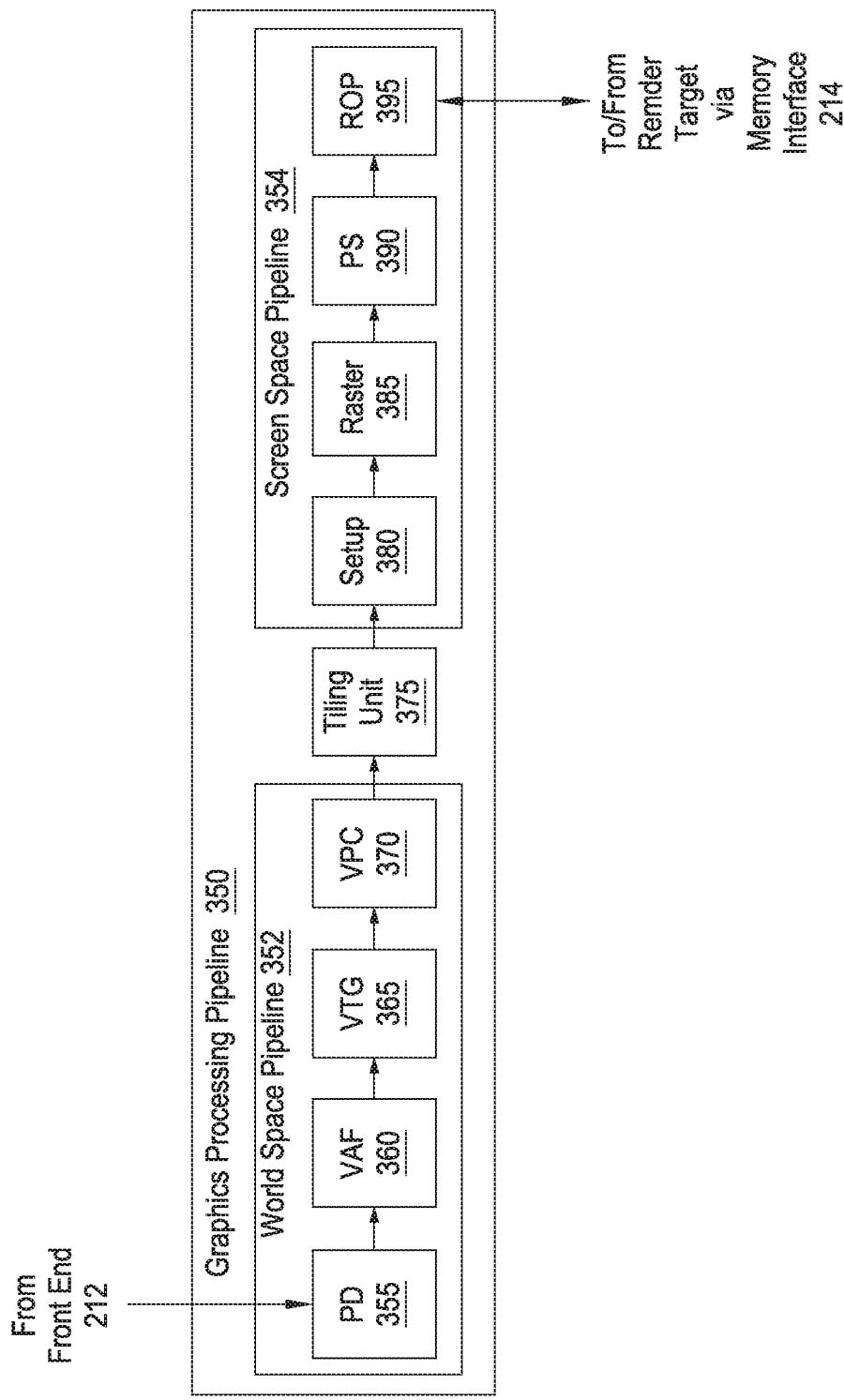
FIG. 3B is a conceptual illustration of a graphics processing pipeline that may be implemented within the parallel processing unit of FIG. 2, according to one embodiment of the present invention.

FIG. 3B is a conceptual illustration of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360, and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, cuffing, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

As used herein, references to shared memory may include any one or more technically feasible memories, including, without limitation, a local memory shared by one or more SMs 310, or a memory accessible via the memory interface 214, such as a cache memory, parallel processing memory 204, or system memory 104. As also used herein, references to cache memory may include any one or more technically feasible memories, including, without limitation, an L1 cache, an L1.5 cache, and the L2 caches.

Tiled Caching

Figure 4:
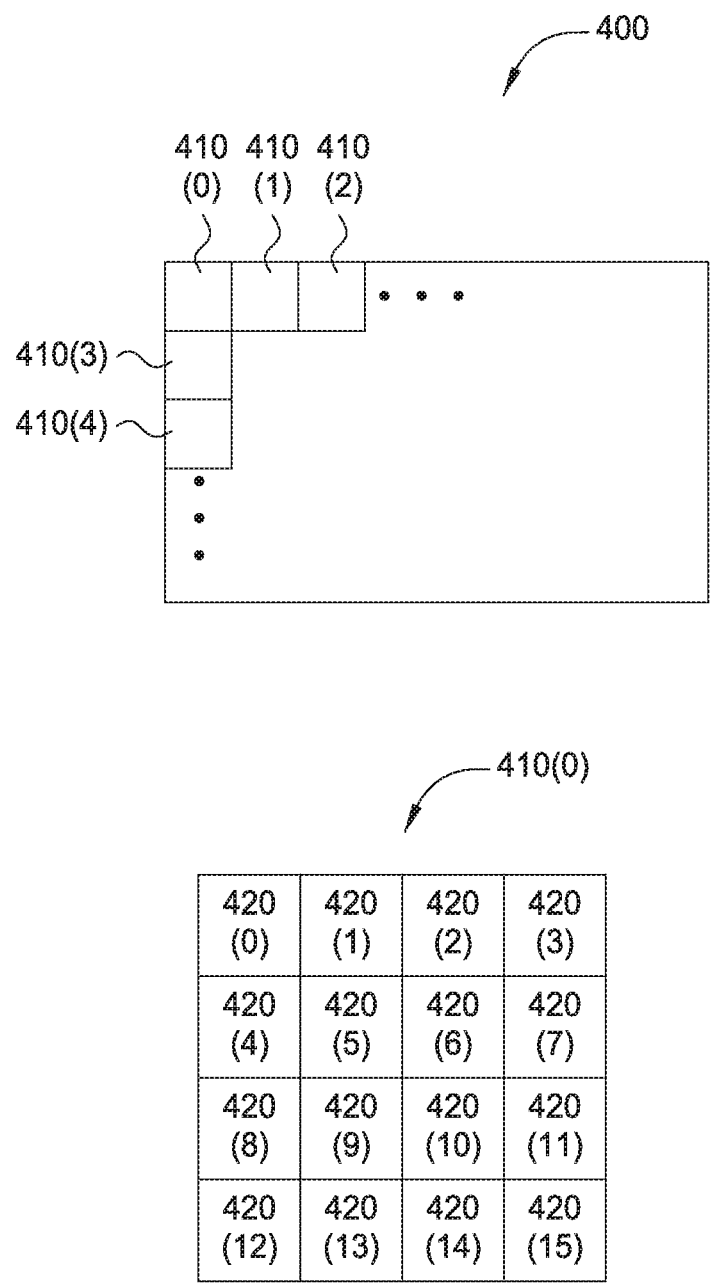
FIG. 4 is a conceptual illustration of a cache tile that the graphics processing pipeline of FIG. 3B may be configured to generate and process, according to one embodiment of the present invention.

FIG. 4 is a conceptual illustration of a cache the 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache the may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache the is compressed. As a general matter, a cache the is sized to increase the likelihood that the cache the data remains resident in the cache memory until all graphics primitives associated with the cache the are fully processed.

The raster tiles 420 represent a portion of the cache the 410(0). As shown, the cache the 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache the 410(0) were processed by four different GPCs 208, then each GPC 208 could be assigned to process four of the sixteen raster tiles 420 in the cache tile 410(0). Specifically, the first GPO 208 could be assigned to process raster tiles 420(0), 420(7), 420(10), and 420(13). The second GPC 208 could be assigned to process raster tiles 420(1), 420(4), 420(11), and 420(14). The third GPO 208 could be assigned to process raster tiles 420(2), 420(5), 420(8), and 420(15). The fourth GPO 208 would then be assigned to process raster tiles 420(3), 420(6), 420(9), and 420(12). In other embodiments, the processing of the different raster tiles within a given cache the may be distributed among GPCs 208 or any other processing entities included within computer system 100 in any technically feasible manner.

Referring back now to FIG. 3B, raster 385 is configured to generated coverage data for pixels based on world space geometry, as mentioned above. In doing so, raster 385 is configured to implement different sample patters for each pixel, and to vary those sample patterns, for each pixel, across sequential frames. For example, for a given pair of adjacent pixels, raster 385 may implement a set of two different sample patterns for those pixels for a given frame. Then, for a subsequent frame, raster 385 may implement another set of two different sample patterns for those pixels. Thus, for each pixel, the sample pattern used varies between frames, and, additionally, varies compared to neighboring pixels within the same frame. This general approach may be referred to herein as "multiframe antialiasing," or MFAA.

With this approach, raster 385 effectively multiplies the multisample antialiasing mode for each pixel across many frames without actually requiring additional sample per pixel. For example, instead of implementing N samples per pixel, raster 385 could instead implement N/M different samples per pixel across M frames, yielding N total samples. Since sequential frames are relatively coherent, meaning that graphics objects typically do not move significantly between frames, this approach may cause a viewer to perceive higher-quality rendered images that appear to be rendered with higher orders of multisample antialiasing that what raster 385 actually implements. This functionality of raster 385 is described in greater detail below in conjunction with FIGS. 5-9.

Varying Sample Patterns Spatially and/or Temporally

Figure 5:
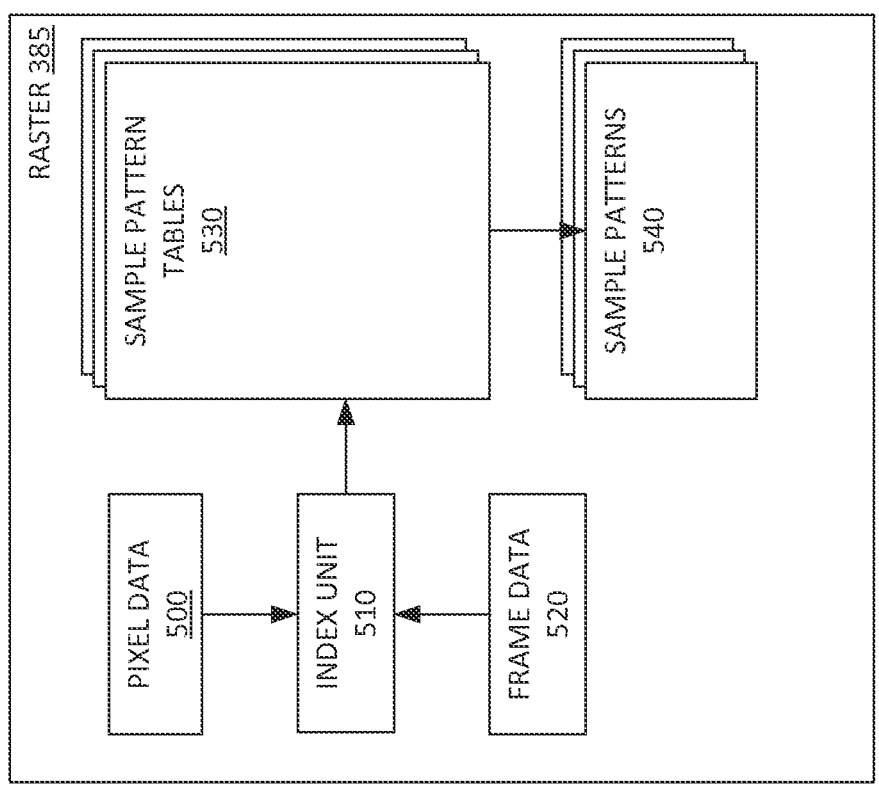
FIG. 5 is a block diagram illustrating the raster unit of FIG. 3B in greater detail, according to one embodiment of the present invention.

FIG. 5 is a block diagram illustrating the raster unit of FIG. 3B in greater derail, according to one embodiment of the present invention. As shown, raster unit 385 includes pixel data 500, an index unit 510, frame data 520, a set of sample pattern tables 530, and a set of sample patterns 540. Pixel data 500 includes data specifying an X and Y coordinate for each pixel within a frame currently being rendered by graphics processing pipeline 385 for display. Frame data 520 includes a frame number associated with that frame.

Each sample pattern table 530 includes a set of sample patterns associated with a particular frame number or type of frame number. For example, sample pattern tables 530 could include two sample pattern tables; a first table that includes sample patterns for use with odd numbered frames, and a second table that includes sample patterns for use with even numbered frames. Device driver 103 may configure the number of sample pattern tables 530 and set each sample pattern table 530. In practice, device driver 103 may include two sample pattern tables for use with odd and even numbered frames, as described above, although persons skilled in the art will understand that any number of such tables falls within the scope of the present invention.

Index unit 510 is configured to receive frame data 520 and to then select, based on the frame number, a particular sample pattern table 530 to be used with the current frame. Index unit 510 then processes pixel data 500 and, for each pixel, generates an index into the selected sample pattern table 530. The generated index refers to a number of entries within the selected sample pattern table 530. Each entry indicates an XY location, within a pixel, where a coverage sample should be generated for the pixel by raster 385. Sample pattern 340 includes all such XY locations for a particular pixel. Raster 385 is configured to generate coverage information for the pixel based on the sample pattern 340 corresponding to that pixel. The approach described generally above is also described in greater detail, by way of example, below in conjunction with FIGS. 6A-6B.

Figure 6A:
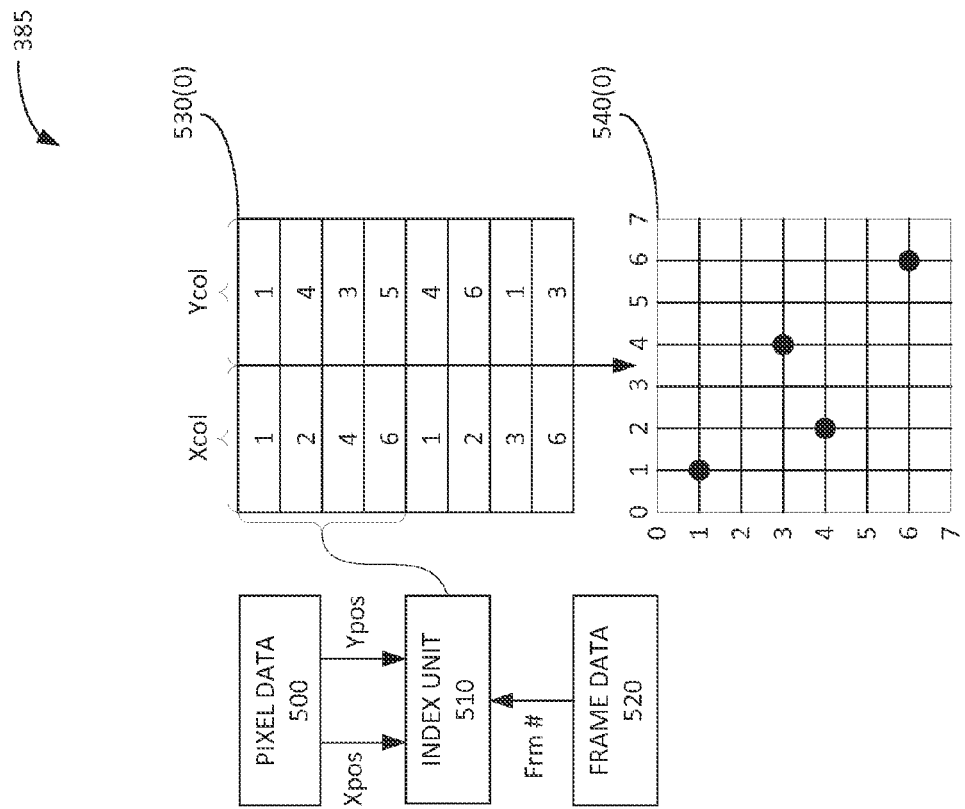
FIG. 6A-6B are conceptual illustrations of operations performed by the raster unit of FIG. 5 when generating sample patterns, according to various embodiments of the present invention.
Figure 6B:
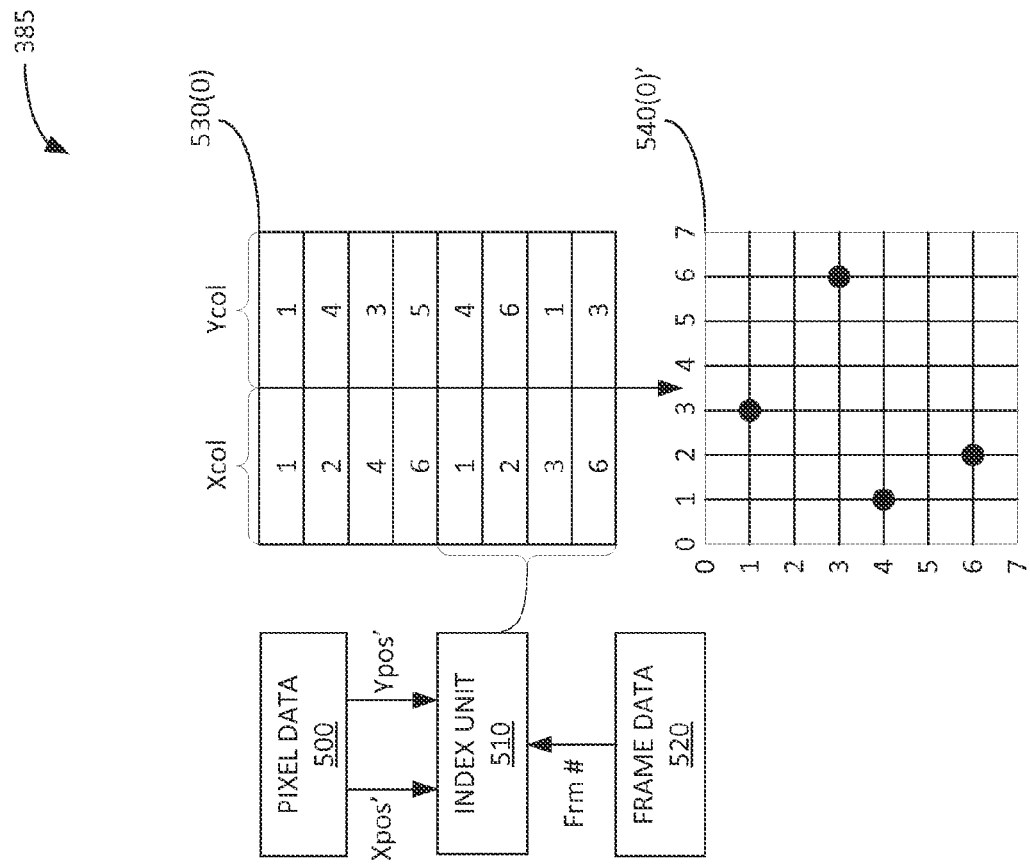

FIG. 6A-6B are conceptual illustrations of operations performed by the raster unit of FIG. 5 when generating sample patterns, according to various embodiments of the present invention. The present example relates to configurations where raster 385 may sample each pixel at up to 64 unique locations. Further, this example relates to a multiframe antialiasing mode where raster 385 implements four samples per pixel. Thus, the exemplary scenario discussed below sets forth an effective 8× antialiasing mode, with only 4× sample locations. Persons skilled in the art will understand that the examples discussed herein are not intended to limit the scope of the present invention in any way. Raster 385 may be configured to sample pixels at any number of locations and to implement any number of samples per pixel.

In FIG. 6A, index unit 510 receives an Xpos and a Ypos from pixel data 500. Xpos and Ypos together reflect the XY position of a single pixel. Index unit 510 also receives a frame number (frm #) from frame data 520. Based on the frame number, index unit 510 selects sample pattern table 530(0). Then, index unit parses Xpos and Ypos to generate an index into sample pattern table 530(0). The generated index selects a range of entries included in that table. Each entry includes an X location and a Y location that reside in an X column (Xcol) and Y column (Ycol), respectively. In one embodiment, index unit 510 parses a number of least significant bits (LSBs) from Xpos and from Ypos, and then combines those LSBs to generate the index. As shown, index unit 510 may then access a range of entries within sample pattern table 530(0) in order to produce sample pattern 540(0) for the pixel residing at Xpos and Ypos. FIG. 6B illustrates a similar procedure performed relative to a different pixel.

In FIG. 6B, index unit 510 receives Xpos' and a Ypos' from pixel data 500. Xpos' and Ypos' reflect the XY position of a pixel neighboring the pixel discussed above in conjunction with FIG. 6A. Index unit parses Xpos' and Ypos' to generate another index into sample pattern table 530(0) that selects a different range of entries included in that table. As shown, index unit 510 may then access another range of entries within sample pattern table 530(0) in order to produce sample pattern 540(0)' for the neighboring pixel.

Referring generally to FIGS. 6A-6B, index unit 510 may perform the above-described procedure for each different pixel within the frame, thereby generating different sample patterns for neighboring pixels. In addition, index unit 510 may select different sample pattern tables 530 for different frames. Thus, the sample pattern 540 selected for a given pixel may change between frames. Generally, the number of different sample patterns 540 used for a given pixel reflects the degree of antialiasing configured by device driver 103.

For example, in FIGS. 6A-6B, raster 385 is configured to perform MFAAx8, or 8× multiframe antialiasing. In such a case, raster 385 would generate a sample at four locations within each pixel for each frame, across two sequential frames. Again, the degree of effective multisample antialiasing is equivalent to the number of samples per pixel per frame multiplied by the number of frames across which the sample pattern changes. Thus, in the example discussed herein, the effective 8× multisampling is achieved by distributing four different sample locations across two sequential frames.

Persons skilled in the art will understand that any specific MFAA mode may be implemented by adjusting the number of samples per pixel, and the number of frames across which the sample pattern changes. For example, in order to implement MFAAx6, raster 385 could generate a sample for each pixel at different pairs of locations, across three sequential frames. The specific values described herein are provided for exemplary purposes only, and not intended to limit the scope of the present invention in any way. FIGS. 7A-7D set forth a variety of different sample patterns that may be used to generate samples in order to compute coverage information.

FIGS. 7A-7D illustrate exemplary sample patterns that may be generated by the raster unit of FIG. 5, according to various embodiments of the present invention. As a general matter, each of FIGS. 7A-7D illustrates four sample patterns that may be implemented to generate samples for four adjacent pixels. In addition, each sample pattern indicates different sample locations that are active during specifically numbered frames. For example, some sample locations shown in these figures may be active during even numbered frames, while others may be active during odd numbered frames. The following examples are provided for exemplary purposes only and are not intended to limit the scope of the present invention in any way.

Figure 7A:
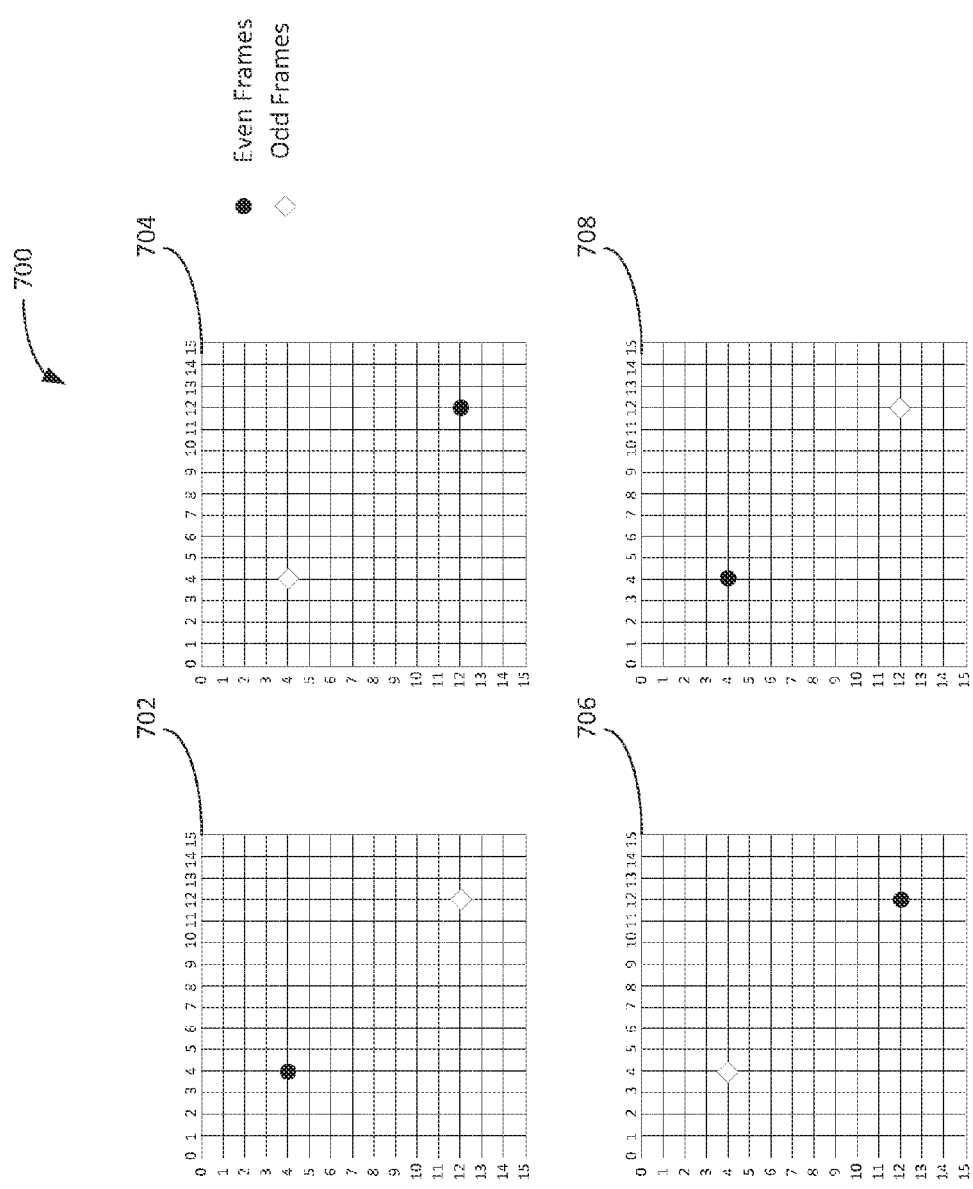

FIG. 7A illustrates a scenario where a 1× multisample antialiasing mode (one sample per pixel) effectively provides 2× multiframe antialiasing mode. As shown, a pixel group 700 includes pixels 702, 704, 706, and 708. Raster 385 may generate a coverage sample for each pixel at up to 256 locations. For each frame, raster 385 generate only one coverage sample per pixel. However, the location of that one sample varies across odd and even numbered frames.

Figure 7C:
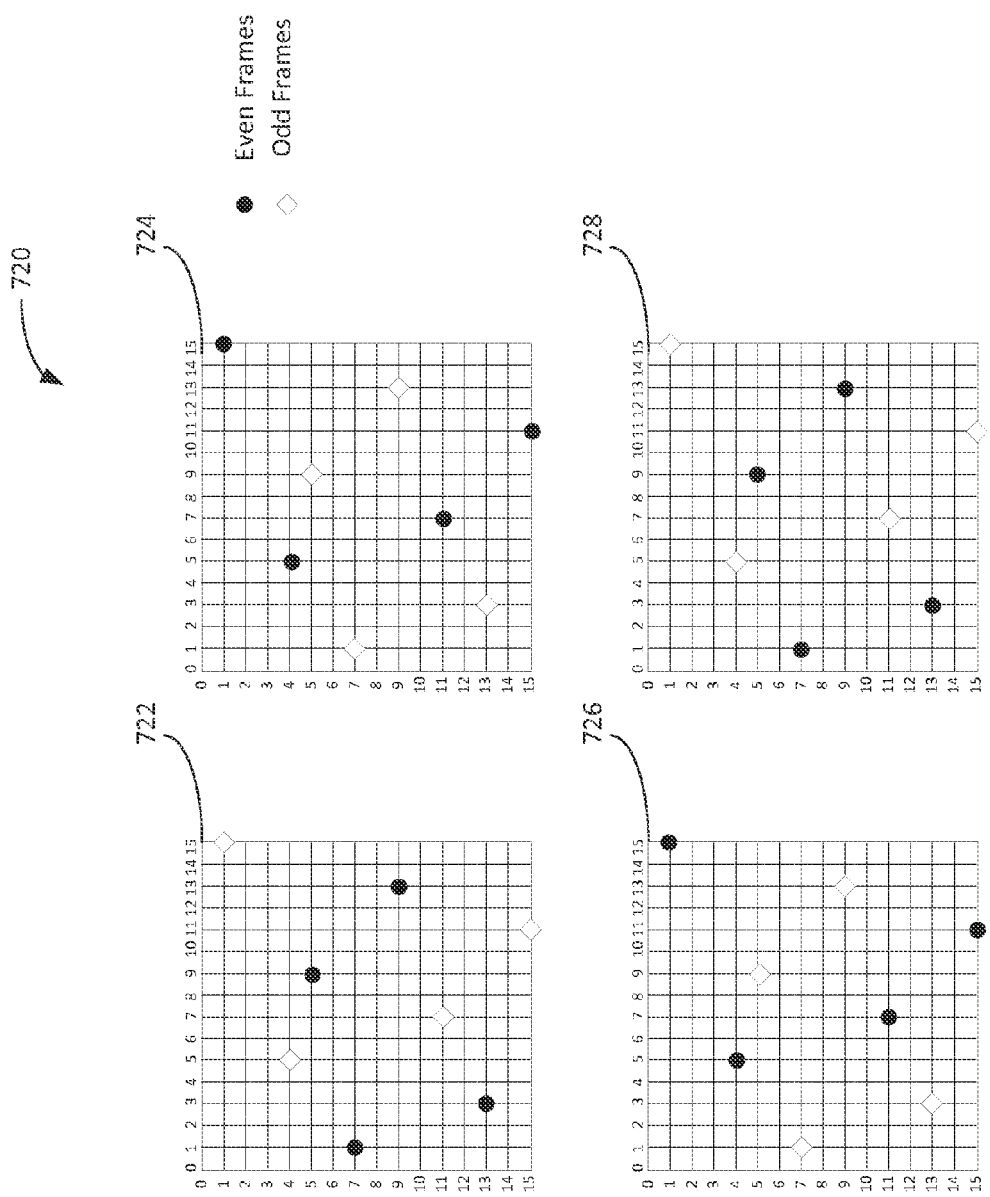
Figure 7D:
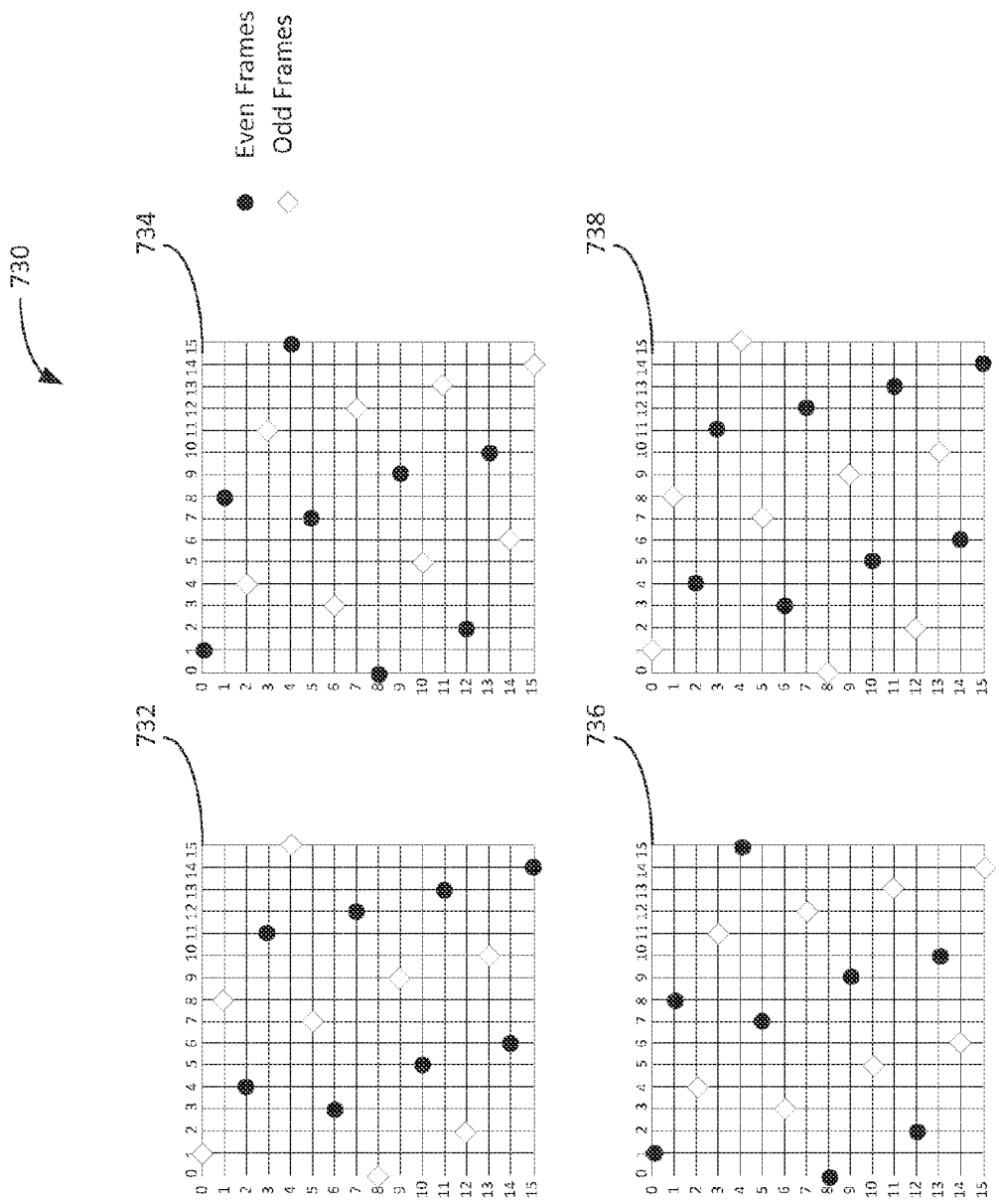

For example, raster 385 may generate a coverage sample for pixel 702 at location (4, 4) when processing even numbered frames, and then generate a coverage sample for that pixel at location (12, 12) when processing odd numbered frames. In addition, since each of pixels 702, 704, 706, and 708 reside at different XY positions within a frame, the sample pattern used for each such pixel may vary compared to neighboring pixels. For example, pixels 702 and 704 have different sample patterns within a given frame. However, pixels 704 and 706 have the same sample pattern within a given frame. FIGS. 7B-7D illustrate higher orders of MFAA that may be achieved using the techniques discussed herein.

FIG. 7B illustrates a scenario where a 2× multisample antialiasing mode effectively provides 4× multiframe antialiasing mode. As shown, a pixel group 710 includes pixels 712, 714, 716, and 718. For each frame, raster 385 generates two coverage samples per pixel, where the location of those samples varies across odd and even numbered frames. Thus, 4×MFAA may be achieved by distributing 2× samples across two sequential frames.

FIG. 7C illustrates a scenario where a 4× multisample antialiasing mode effectively provides 8× multiframe antialiasing mode. As shown, a pixel group 720 includes pixels 722, 724, 726, and 728. For each frame, raster 385 generates four coverage samples per pixel, where the location of those samples varies across odd and even numbered frames. Thus, 8×MFAA may be achieved by distributing 4× samples across two sequential frames.

FIG. 7D illustrates a scenario where an 8× multisample antialiasing mode effectively provides 16× multiframe antialiasing mode. As shown, a pixel group 730 includes pixels 732, 734, 736, and 738. For each frame, raster 385 generates eight coverage samples per pixel, where the location of those samples varies across odd and even numbered frames. Thus, 16×MFAA may be achieved by distributing 8× samples across two sequential frames.

Figure 8:
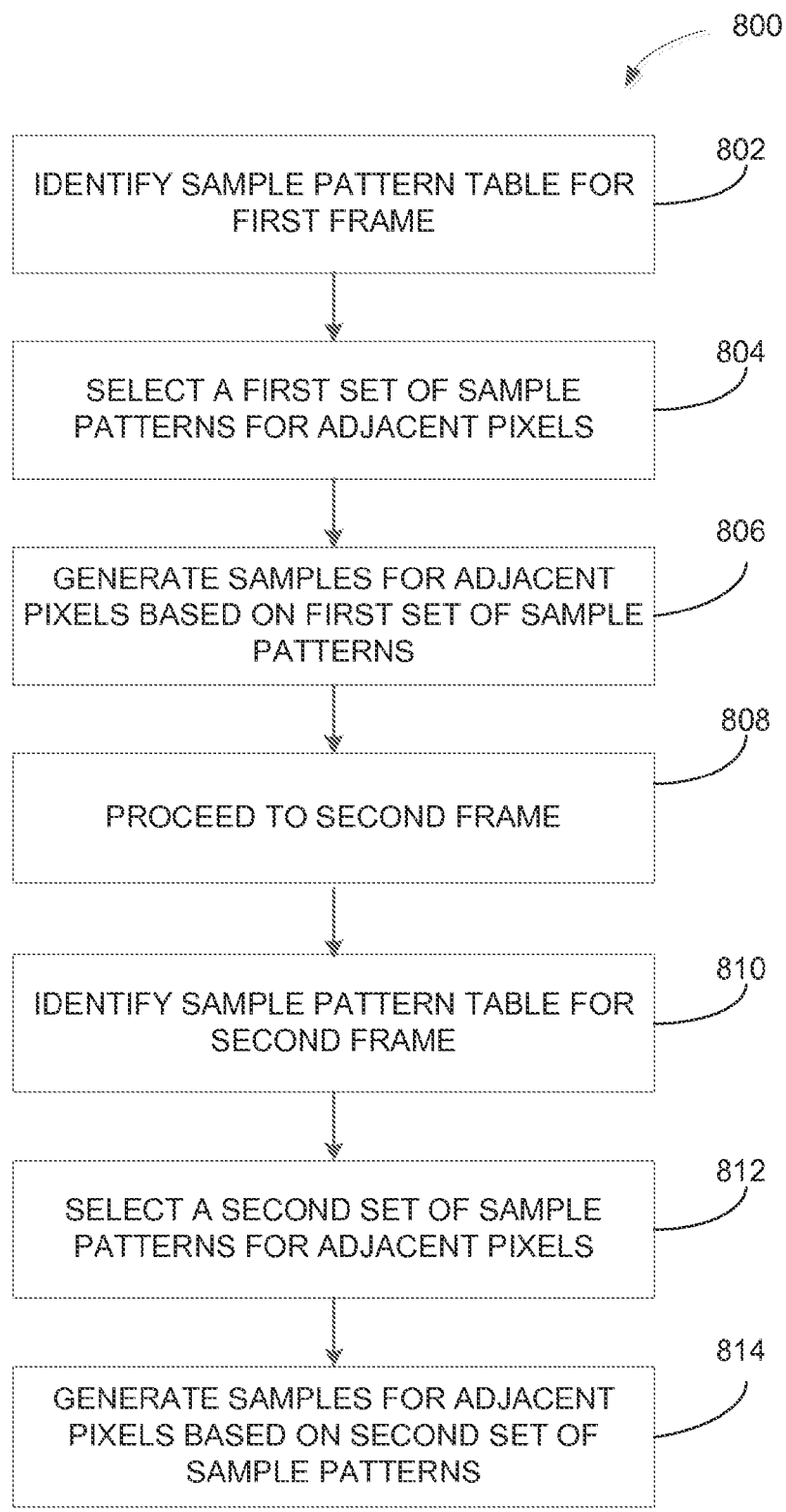
FIG. 8 is a flow diagram of method steps for generating different sample patterns for adjacent pixels across different frames, according to one embodiment of the present invention.
Figure 9:
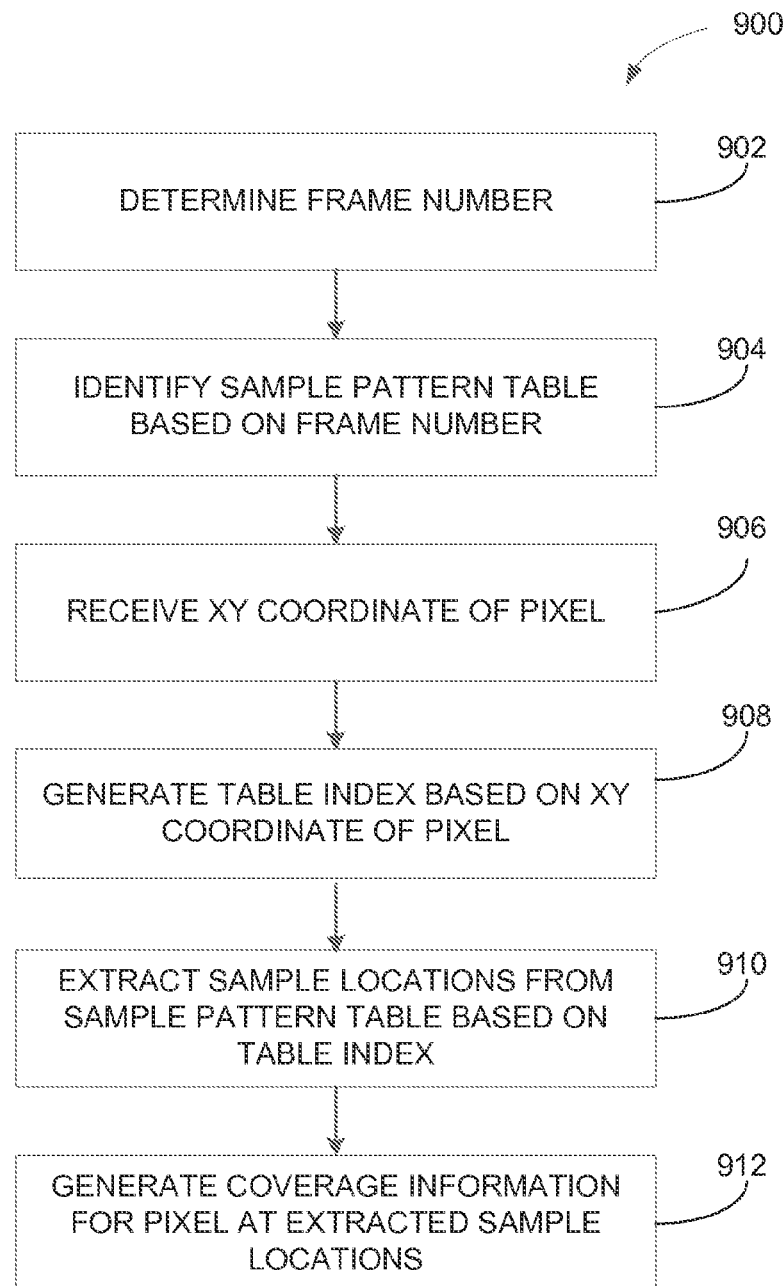
FIG. 9 is a flow diagram of method steps for generating a sample pattern for a pixel, according to one embodiment of the present invention.

Referring generally to FIGS. 7A-7D, the exemplary sample patterns illustrated herein are provided for exemplary purposes. Raster 385 may implement a wide variety of different sample patterns, distributed in any technically feasible fashion, which may vary across any number of sequential frames. FIGS. 8 and 9 describe the general operation of raster 385 in stepwise fashion.

FIG. 8 is a flow diagram of method steps for generating different sample patterns for adjacent pixels across different frames, according to one embodiment of the present invention. Although the method steps are described in conjunction with the systems of FIGS. 1-7D, persons skilled in the art will understand that any system configured to perform the method steps, in any order, is within the scope of the present invention.

As shown, a method 800 begins at step 802, where index unit 510 within raster 385 identifies a sample pattern table 530 associated with a first frame. In doing so, index unit 510 may parse frame data 520 to identify a frame number associated with the current frame, and then select the sample pattern table based on that number. At step 804, index unit 510 selects a first set of sample patterns, from within the selected sample pattern table, for generating coverage information for adjacent pixels. The first set of sample patterns may include a different sample pattern for each adjacent pixel, in some embodiments. At step 806, raster 385 generates coverage samples for the adjacent pixels based on the first set of sample patterns.

At step 808, raster 385 proceeds to a second frame. In response, frame data 520 may be updated to reflect a new frame number associated with the second frame. At step 810, index unit 510 within raster 385 identifies another sample pattern table 530 associated with the second frame. Index unit 510 may parse updated frame data 520 to identify a number associated with the second frame, and then select a new sample pattern table based on that number. At step 812, index unit 510 selects a second set of sample patterns, from within the selected sample pattern table, for generating coverage information for the adjacent pixels. The second set of sample patterns may include a different sample pattern for each adjacent pixel. In some embodiments, the second set of sample patterns may reflect a transposition of the first set of sample patterns. At step 806, raster 385 generates samples for the adjacent pixels based on the second set of sample patterns.

By implementing the method 800, raster 385 may independently configure the sample pattern for each pixel on a frame-by-frame basis. This approach is sufficiently flexible to implement a wide range of different multiframe antialiasing modes without suffering the substantial increase in overhead typically experienced with conventional multisampling approaches. FIG. 9 describes the functionality of index unit 510 in greater detail.

FIG. 9 is a flow diagram of method steps for generating a sample pattern for a pixel, according to one embodiment of the present invention. Although the method steps are described in conjunction with the systems of FIGS. 1-7D, persons skilled in the art will understand that any system configured to perform the method steps, in any order, is within the scope of the present invention.

As shown, a method 900 begins at step 902, where index unit 510 determines the frame number of the current frame. Index unit 510 may parse frame data 520 to determine the frame number at step 902. At step 904, index unit 510 identifies a sample pattern table 530 corresponding to the current frame number. At step 906, index unit 510 receives an XY coordinate associated with a given pixel. The XY coordinate reflects the position of the pixel within the current frame.

At step 908, index unit 510 generates an index into the selected sample pattern table. The index refers to a range of entries in the selected sample pattern table. At step 910, index unit 510 extracts a set of sample pattern positions from the selected sample pattern table based on the index generated at step 908. At step 910, raster 385 generates coverage information for the pixel at the extracted sample locations. Index unit within raster 385 may implement the method 900 for each different pixel within the frame in order to generate coverage information, using different sample patterns, for each such pixel.

Referring generally to FIGS. 5-9, the multiframe antialiasing techniques discussed herein may be applied to increase the effective multisampling mode. The quality of rendered graphics images may thus be increased because, in effect, higher resolution coverage data is generated. In addition, with certain embodiments, the techniques discussed herein may be applied to increase the effective super sampling mode implemented by a shader executed by SMs 310. In one embodiment, the coverage sample locations generated by raster 385 may be copied to generate shader sample locations for pixel shading purposes. In doing so, device driver 103 may configure SM 310 to adjust shader sample locations for each pixel to reflect the particular sample patterns 340 used for each pixel. With this approach, device driver 103 may implement effective super sampling within SM 310 without the need for additional shader samples, thereby increasing image quality.

The quality of images generated using the above techniques may be further increased through the use of specialized filters that reduce visual artifacts potentially induced by changing sample patterns across frames. These filtering techniques, referred to below as "temporal-spatial filtering," may be applicable in graphics environments that include stationary objects, moving objects, or a combination of both, as described in greater detail below in conjunction with FIGS. 10-14.

Temporal-Spatial Filtering

Figure 10:
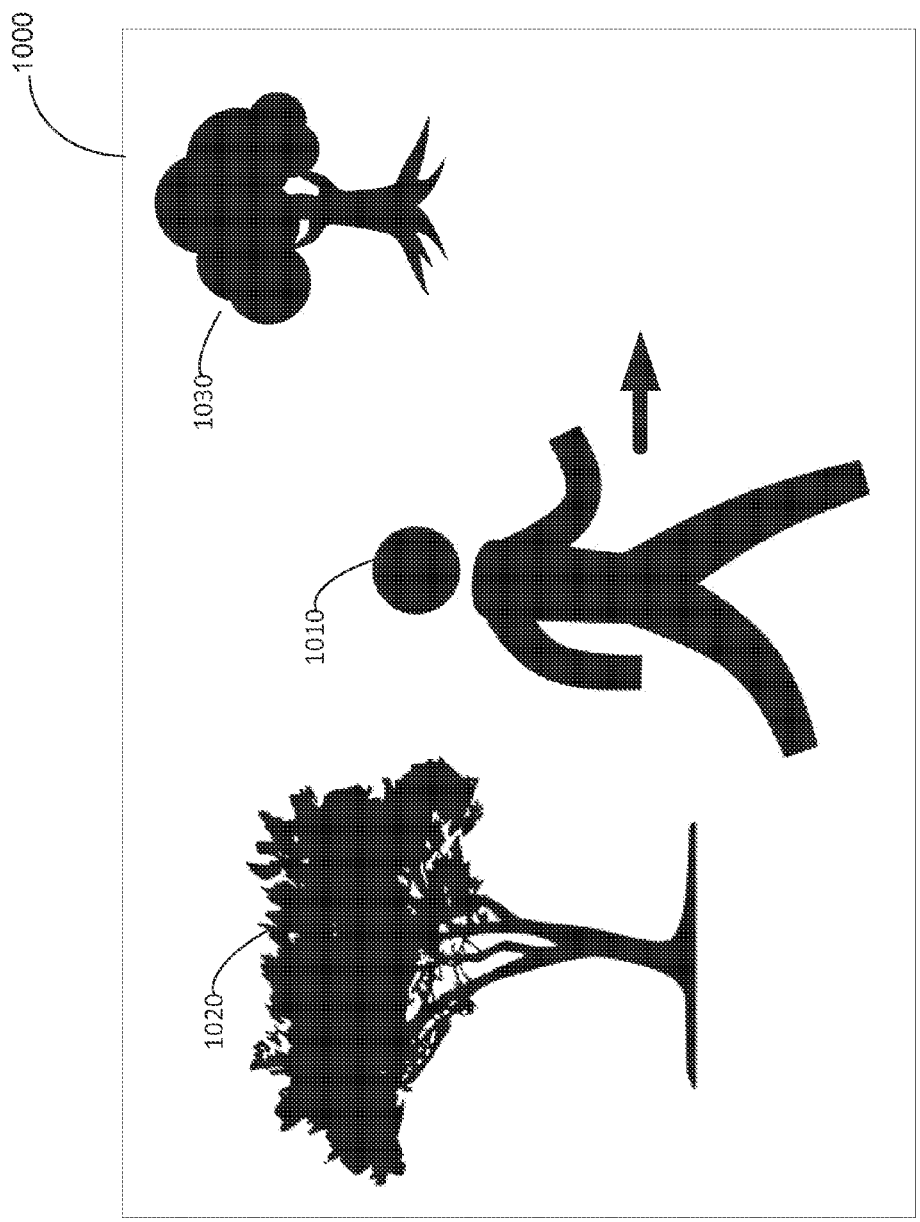
FIG. 10 illustrates an exemplary graphics scene where temporal-spatial filtering may be applied to improve image quality, according to one embodiment of the present invention.

FIG. 10 illustrates an exemplary graphics scene where temporal-spatial filtering may be applied to improve image quality, according to one embodiment of the present invention. As shown, a frame 1000 of a graphics scene includes a moving object 1010 and stationary objects 1020 and 1030. When the multiframe antialiasing techniques described in conjunction with FIGS. 5-9 are implemented to render frame 1000, certain types of artifacts may appear due, at least in part, to the changing of sample patterns across neighboring pixels and between frames.

For example, when stationary object 1020 is rendered, the changing of sample patterns between frames may cause that object to appear to jitter slightly. This jitter could arise, for example, because different sample patterns yield different coverage information for the same pixel across different frames. Thus, the edge of stationary object 1020 may appear to move. In another example, when moving object 1010 travels across frame 1000, the changing of sample patterns between frames, combined with the motion of object 1000, may cause a sawtooth pattern to appear on edges of that object. Other types of artifacts may also arise, such as ghosting of moving object 1010 between frames.

To mitigate these issues, device driver 103 performs various temporal-spatial filtering operations. Specifically, to mitigate artifacts associated with stationary objects, device driver 103 performs a temporal blend, whereby corresponding pixels within previous frames are blended together. To mitigate artifacts associated with moving objects, device driver 103 performs a spatial blend, whereby neighboring pixels that reside along edges are blended together.

Device driver 103 may perform a temporal blend, a spatial blend, or a combination of the two, on a per-pixel basis depending on an amount of motion associated with the pixel. Thus, if a given pixel is determined to be stationary, then device driver 103 initiates a temporal blend. Alternatively, if a given pixel is determined to be moving, the device driver 103 initiates a spatial blend. Device driver 103 may perform a combined spatial-temporal blend using techniques described in greater detail below in conjunction with FIGS. 12-14.

In operation, device driver 103 can be configured to detect motion associated with pixels by comparing pixel values across previous frames. In doing so, device driver 103 generally compares previous frames having similar sample pattern arrangements. For example, when raster 385 changes sample patterns between odd and even numbered frames, as described in conjunction with FIGS. 6A-7D, device driver 103 compares corresponding pixels within a set of even numbered frames and/or compare corresponding pixels within a set of odd numbered frames. This approach is meant to eliminate false detection of motion that could arise from the changing of sample patterns.

In practice, device driver 103 compares a number of even numbered frames to determine whether the difference between those pixel values exceeds a first threshold. Device driver 103 also compares a number of odd numbered frames to determine whether the difference between those pixel values exceeds a second threshold. If both the first threshold and the second threshold are exceeded, then device driver 103 identifies motion. This approach may be performed to identify motion on a per-pixel basis. In one embodiment, device driver 103 may implement this approach by configuring SMs 310 to perform the aforementioned motion detection functionality. The spatial-temporal filtering techniques described herein are also described, in stepwise fashion, below in conjunction with FIG. 11.

Figure 11:
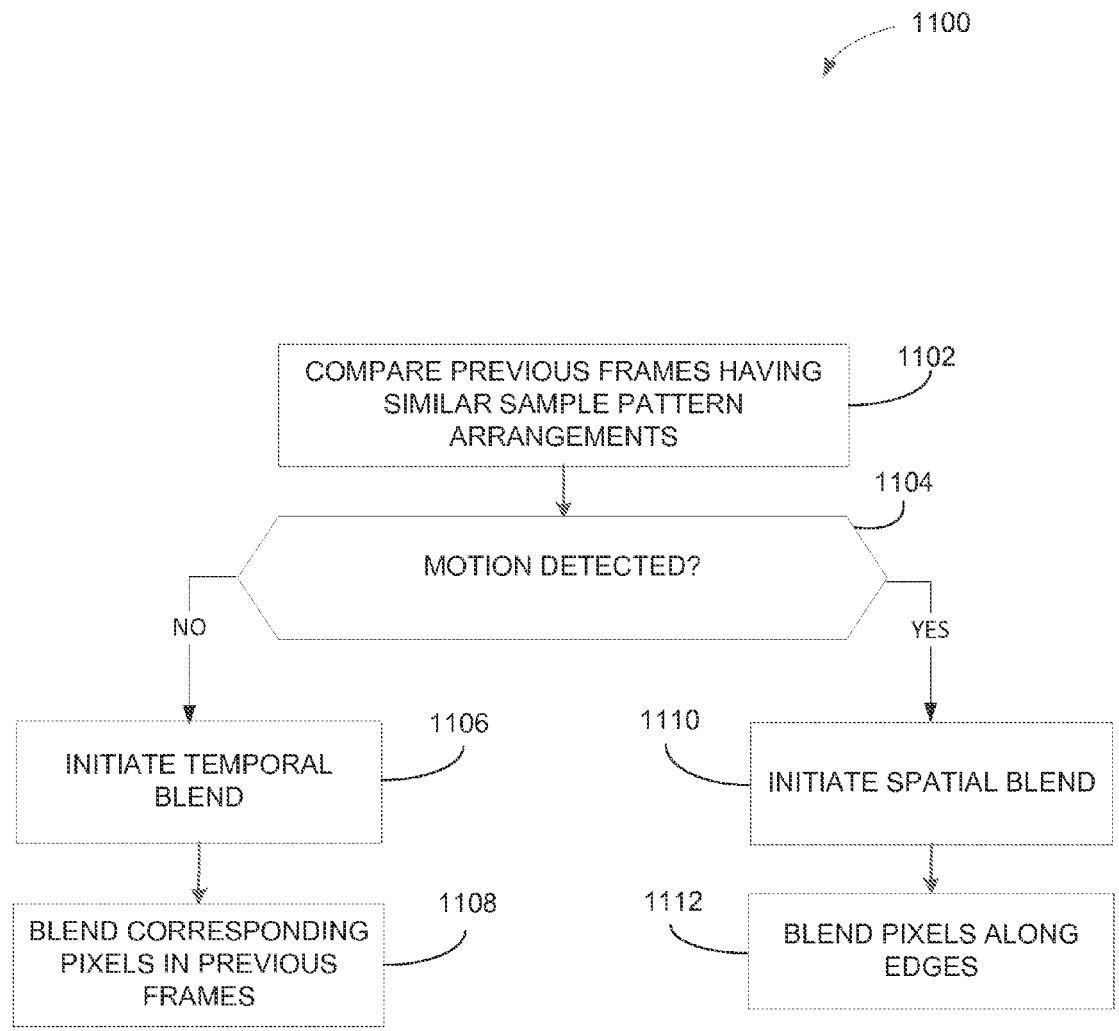
FIG. 11 is a flow diagram of method steps for filtering pixel data based on detected motion, according to one embodiment of the present invention.

FIG. 11 is a flow diagram of method steps for filtering pixel data based on detected motion, according to one embodiment of the present invention. Although the method steps are described in conjunction with the systems of FIGS. 1-7D and 10, persons skilled in the art will understand that any system configured to perform the method steps, in any order, is within the scope of the present invention.

As shown, a method 1100 begins at step 1102, where device driver 103 compares previous frames having similar sample pattern arrangements. For example, if raster 385 changes sample patterns between even and odd numbered frames, then device driver 103 could compare frame N to frame N−2, and compare frame N−1 to frame N−3. At step 1104, device driver 103 determines whether motion is detected. In doing so, device driver 103 may determine whether the difference between pixel values of previous frames is greater than a threshold value. For example, device driver 103 could determine whether the difference between frame N and frame N−2 exceeds the threshold. Device driver 103 could also determine whether the difference between frames N−1 and N−3 exceeds another threshold. If either one of, or both of the thresholds is exceeded, then device driver 103 detects motion.

If, at step 1104, device driver 103 does not detect motion, then the method proceeds to step 1106, where device driver 103 initiates a temporal blend. In doing so, device driver 103 may configure SM 310 to perform the temporal blend. At step 1108, device driver 103 blends corresponding pixels in previous frames. In doing so, device driver 103 may blend a given pixel within a first frame and having a particular XY position with a pixel from a previous frame having the same XY position.

If, at step 1104, device driver 103 does, in fact, detect motion, then the method 1100 proceeds to step 1110, where device driver 103 initiates a spatial blend. In doing so, device driver 103 may configure SM 310 to perform the spatial blend. At step 1112, device driver 103 blends pixels along edges detected within the graphics scene. In one embodiment, device driver 103 implements an edge detection algorithm to identify edges within a neighborhood of pixels. For a given pixel that resides along a detected edge, device driver 103 then selects one or more pixels adjacent to the given pixel and residing along the edge. Then, device driver 103 may blend the given pixel with the adjacent pixels.

Device driver 103 may implement the method 1100 for each different pixel within the frame. Accordingly, certain pixels may be subject to temporal blending, while others may be subject to spatial blending. For example, referring to FIG. 10, pixels associated with stationary objects 1020 and 1030 would be subject to temporal blending, while pixels associated with moving object 1010 would be subject to spatial blending. Device driver 103 may also perform a mixture of spatial and temporal blending for each different pixel. For example, device driver 103 could assign each pixel a motion score, and then perform a combination of temporal filtering and spatial filtering that depends on the motion score. To do so, device driver 103 could weight spatial filtering results based on the motion score, and weight temporal filtering results based on an inverse of the motion score. In addition, device driver 103 may perform filtering to account for the variation of sample patterns within each pixel, as described in greater detail below in conjunction with FIGS. 12A-14.

Figure 12:
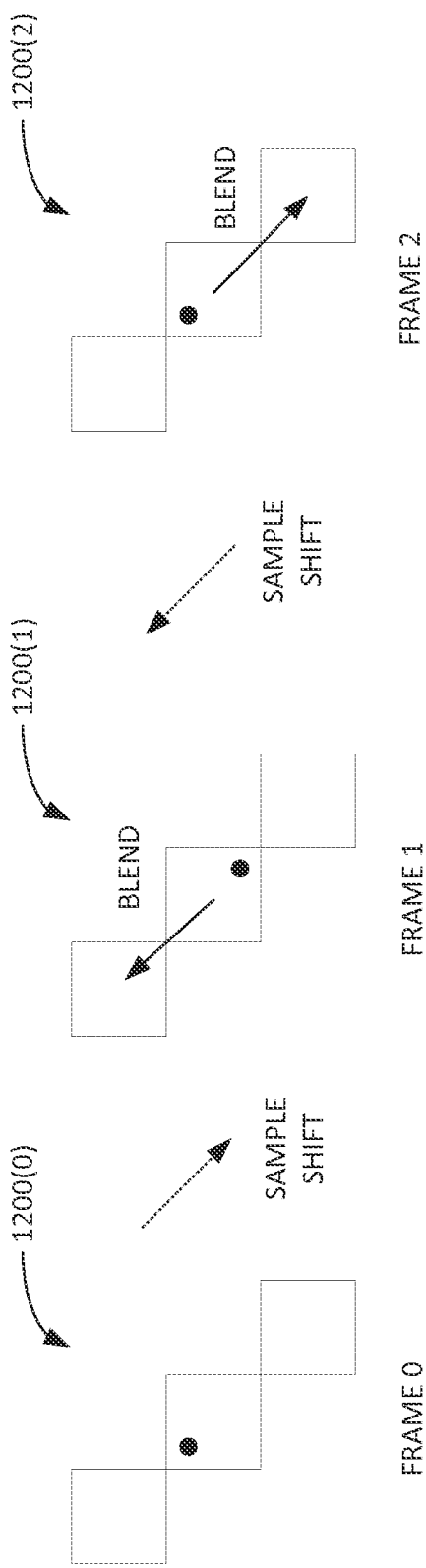
FIG. 12 illustrates exemplary groups of pixels that may be blended based on sample shift direction, according to one embodiment of the present invention.

FIG. 12 illustrates exemplary groups of pixels that may be blended based on sample shift direction, according to one embodiment of the present invention. As shown, instances of a group of pixels 1200 are depicted across three sequential frames. Instance 1200(0) appears in frame 0, instance 1200(1) appears in frame 1, and instance 1200(2) appears in frame 2. As also shown, a sample location within the center pixel of group 1200 changes across frames. In frame 0, the sample location resides in the upper left corner. In frame 1, the sample location resides in the lower right corner. In frame 2, the sample location resides in the upper left corner. The exemplary movement of the sample location described herein may correspond to a multiframe antialiasing mode where the sample locations vary between even and odd numbered frames.

As referred to herein, the "sample shift direction" refers to the direction within a pixel towards which the sample location moves between frames. For example, between frames 0 and 1, the sample location shifts towards the lower right, as indicated by the dashed arrow between those frames. Similarly, between frames 1 and 2, the sample location shifts towards the upper left, as indicated by the dashed arrow between those frames.

Device driver 103 is configured to perform a spatial blend between adjacent pixels based on sample shift direction in order to counteract potentially perceivable motion induced by the shifting of sample locations. Thus, as shown within instance 1200(1), to counteract the lower right sample shift between frames 0 and 1, device driver may blend the center pixel with the upper left pixel in the fashion shown. Similarly, within instance 1200(2), to counteract the upper left sample shift between frames 1 and 2, device driver may blend the center pixel with the lower right pixel, as is shown.

Figure 13:
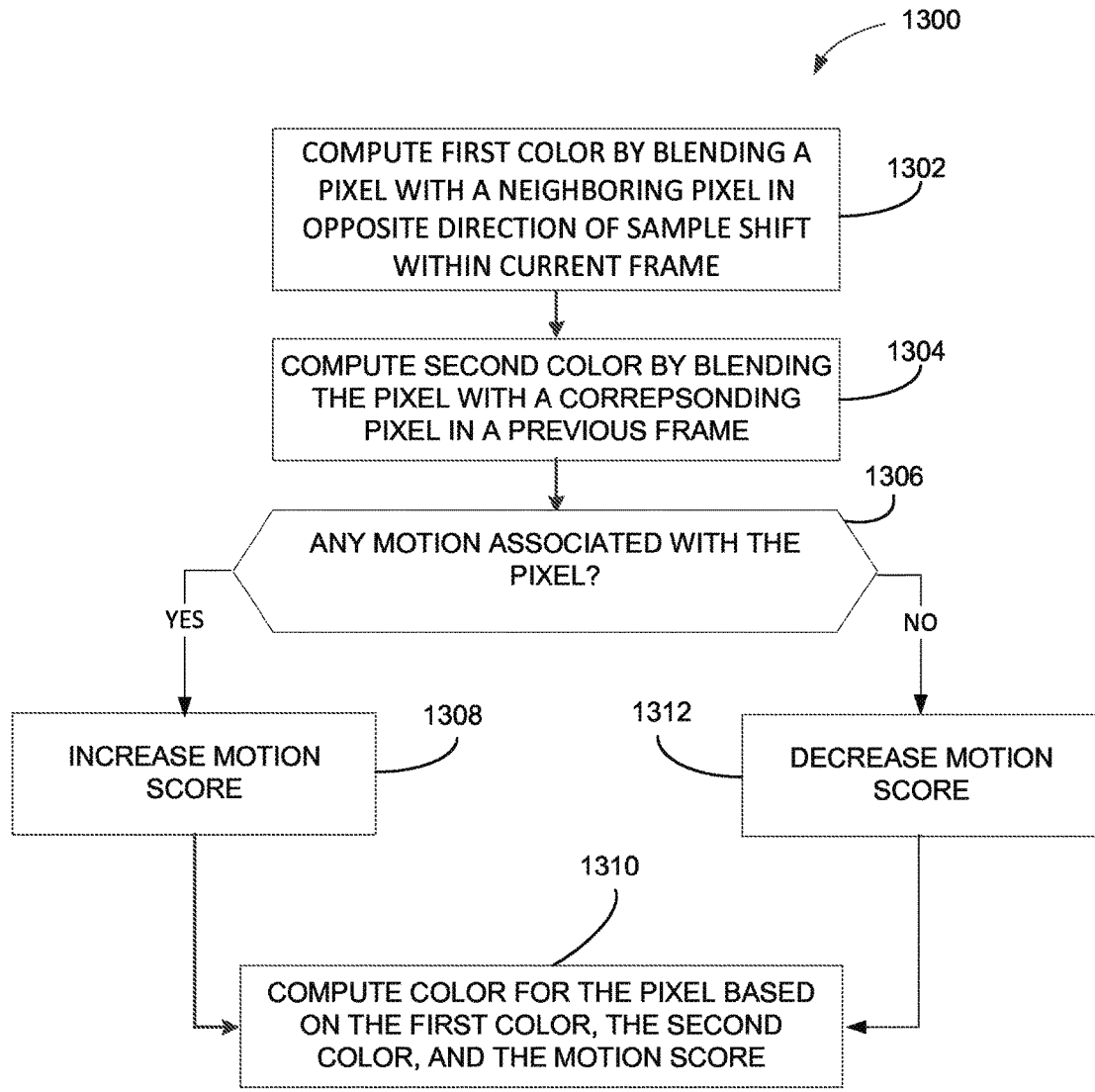
FIG. 13 is a flow diagram of method steps for performing spatial-temporal filtering based on sample shift direction, according to one embodiment of the present invention.
Figure 14:
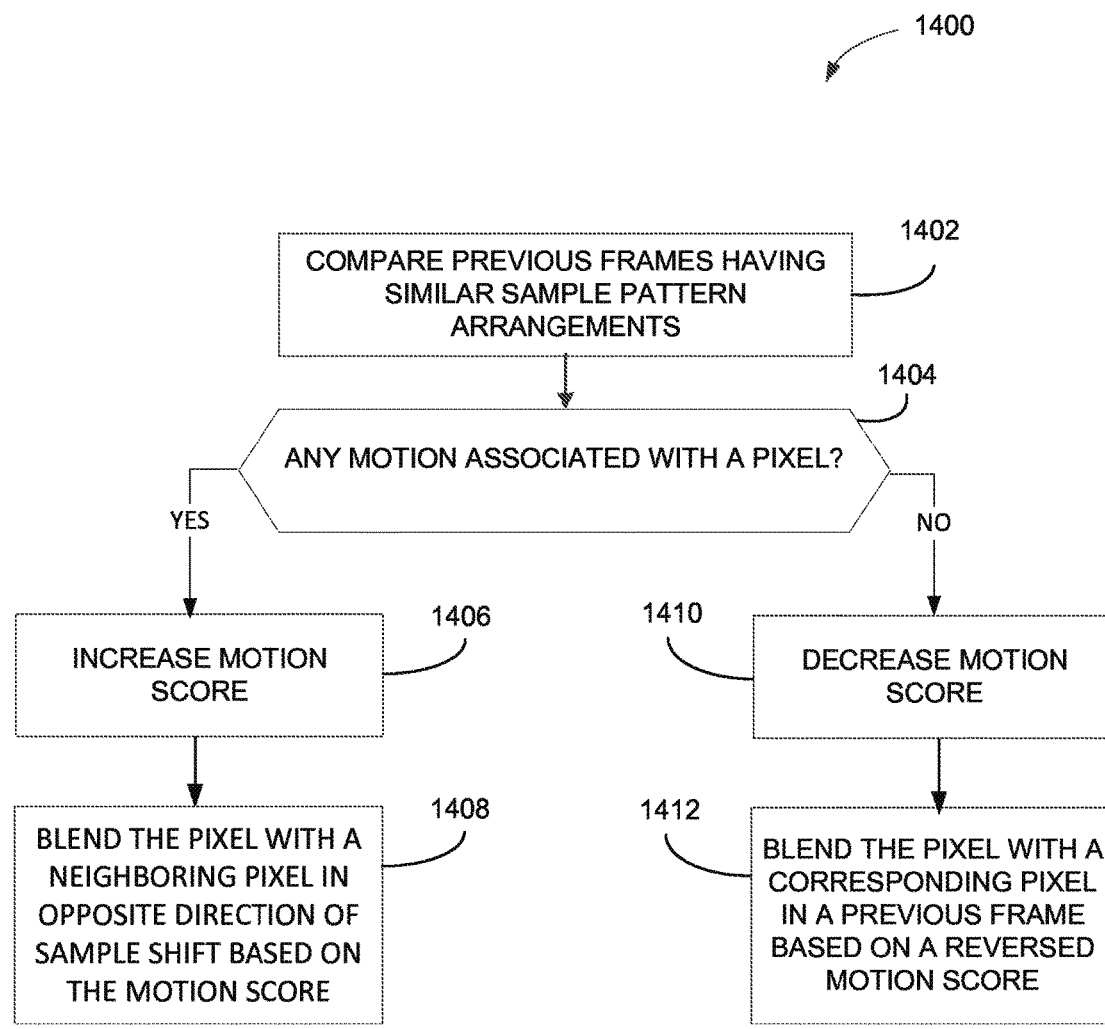
FIG. 14 is a flow diagram of method steps for performing spatial or temporal filtering based on detected motion, according to one embodiment of the present invention.

The blending techniques described above may be implemented to reduce jitter and/or other artifacts within frames rendered using multiframe antialiasing. These techniques may also be combined with the spatial-temporal approaches discussed above in conjunction with FIGS. 10-11. FIGS. 13-14 set forth different filtering techniques for blending pixels based on object motion as well as sample shift motion.

FIG. 13 is a flow diagram of method steps for performing spatial-temporal filtering based on sample shift direction, according to one embodiment of the present invention. Although the method steps are described in conjunction with the systems of FIGS. 1-7D, 10, and 12, persons skilled in the art will understand that any system configured to perform the method steps, in any order, is within the scope of the present invention.

As shown, a method 1300 begins at step 1302, where device driver 103 computes a first color for a pixel by blending the current value of the pixel with a neighboring pixel in the opposite direction to the sample shift direction within the current frame. Device driver 103 may perform step 1302 by implementing a similar technique as depicted in FIG. 12. At step 1304, device driver 103 computes a second color by blending the current value of the pixel with a previous value of the pixel in a previous frame.

At step 1306, device driver 103 determines whether any motion is associated with the pixel. Device driver 103 may compare previous frames to identify motion, as discussed above in conjunction with FIG. 11. If device driver 103 detects motion, then the method 1300 proceeds to step 1308 where device driver 103 increases a motion score for the pixel. The method 1300 then proceeds to step 1310. If, at step 1306, device driver 103 does not detect motion, then the method 1300 proceeds to step 1312, where device driver 103 decreases the motion score for the pixel. The method 1300 then proceeds to step 1310. At step 1310, device driver 103 computes a color value for the pixel based on the first color, the second color, and the motion score. In one embodiment, the operation performed at step 1310 comprises an interpolation between the first color and the second color based on the motion score.

Device driver 103 may implement the method 1300 repeatedly in order shade each pixel within the current frame. In doing so, device driver 103 may configure SM 310 to perform any and all such shading operations. With this approach, device driver 103 filters pixels based on currently detected motion as well as previous motion, while also accounting for sample shift direction. In one embodiment, device driver 103 may weight the first color and the second color based on the motion score, in order to achieve a balance between the first color and the second color that depends on the motion score. The techniques described in conjunction with FIG. 13 may be applicable in scenarios where shader sample locations can be configured to match coverage sample locations.

FIG. 14 is a flow diagram of method steps for performing spatial or temporal filtering based on detected motion, according to one embodiment of the present invention. Although the method steps are described in conjunction with the systems of FIGS. 1-7D, 10, and 12, persons skilled in the art will understand that any system configured to perform the method steps, in any order, is within the scope of the present invention.

As shown, a method 1400 begins at step 1402, where device driver 103 compares previous frames having similar sample pattern arrangements. At step 1404, device driver 103 determines whether any motion is associated with a pixel. If motion is detected, then the method 1400 proceeds to step 1406, where device driver 103 increases a motion score for the pixel. At step 1408, device driver 103 blends the pixel with a neighboring pixel in the opposite direction of the sample shift and based on the motion score. In one embodiment, the blending operation performed at step 1408 comprises an interpolation based on the motion score.

If, at step 1404, motion is not detected, then the method 1400 proceeds to step 1410, where device driver 103 decreases the motion score. At step 1412, device driver 103 blends the pixel with a corresponding pixel in a previous frame based on a reversed motion score. The reversed motion score could be, e.g., 1-(the motion score) or 1/(the motion score). In one embodiment, the blending operation performed at step 1412 comprises an interpolation based on the reversed motion score.

The method 1400 may be applied to balance the blending of pixels with neighboring pixels within the same frame and the blending of corresponding pixels in sequential frames. In some embodiments, when motion is detected, device driver 103 may also blend pixels along detected edges, as well as blending pixels to counteract sample shift. For example, device driver 103 could perform step 1112 of the method 1100 in conjunction with performing step 1408 of the method 1400. The techniques described in conjunction with FIG. 14 may be applicable in scenarios where shader sample locations can be configured to match coverage sample locations. Persons skilled in the art will understand that the various methods described above may be combined in any technically feasible manner.

In sum, a raster unit is configured to generate different sample patterns for adjacent pixels within a given frame. In addition, the raster unit may adjust the sample patterns between frames. The raster unit includes an index unit that selects a sample pattern table for use with a current frame. For a given pixel, the index unit extracts a sample pattern from the selected sample pattern table. The extracted sample pattern is used to generate coverage information for the pixel. The coverage information for all pixels is then used to generate an image. The resultant image may then be filtered to reduce or remove artifacts induced by the changing of sample locations.

At least one advantage of the disclosed techniques is that, with only N/M sample locations per pixel, N coverage samples may be generated across M frames, yielding an image having quality that appears consistent with N coverage samples per pixel. Thus, the effective multisampling mode may be increased without increasing the number of coverage sample locations per pixel. Consequently, the disclosed techniques do not experience a substantial increase in overhead typically associated with conventional multisampling techniques.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A graphics subsystem, comprising:
   a first sample pattern table that includes a first plurality of entries; and
   an index unit that:
     receives a first set of X-Y coordinates associated with a first pixel of a first frame, the first set of X-Y coordinates including an X coordinate and a Y coordinate;
     generates a first index into the first sample pattern table based on the set of coordinates, wherein the first index references a first subset of entries included in the first plurality of entries, and
     extracts the first subset of entries from the first sample pattern table; and
   a rasterizer that generates a first sample at a first location within the first pixel on an indication from a first entry included in the first subset of entries.

2. The graphics subsystem of claim 1, wherein the index unit determines a frame number associated with the first frame and to select the first sample pattern table from a plurality of sample pattern tables based on the frame number.

3. The graphics subsystem of claim 1, wherein the index unit:
   parses one or more least significant bits from the X coordinate;
   parses one or more least significant bits from the Y coordinate; and
   combines the one or more least significant bits from the X coordinate with the one or more least significant bits from the Y coordinate to generate the first index.

4. The graphics subsystem of claim 1, wherein the index unit:
   generates a second index into the first sample pattern table that references a second subset of entries included in the first plurality of entries; and
   extracts the second subset of entries from the first sample pattern table, wherein a second entry included in the second subset of entries indicates a second location within a second pixel of the first frame where a second sample is to be generated.

5. The graphics subsystem of claim 1, further comprising a second sample pattern table that includes a second plurality of entries, wherein the index unit:
generates a second index into the second sample pattern table that references a second subset of entries included in the second plurality of entries; and
extracts the second subset of entries from the second sample pattern table, wherein a second entry included in the second subset of entries indicates a second location within a second pixel of a second frame where a second sample is to be generated.

6. The graphics subsystem of claim 5, wherein the second pixel resides at the first set of X-Y coordinates within the second frame.

7. The graphics subsystem of claim 5, wherein the index unit:
generates a third index into the second sample pattern table, wherein the third index refers to a third subset of entries in the second plurality of entries; and
extracts the third subset of entries from the second sample pattern table, wherein a third entry included in the third subset of entries indicates a third location within a third pixel of the second frame where a third sample is to be generated.

8. The graphics subsystem of claim 7, wherein the second pixel resides at a second set of X-Y coordinates within the second frame, and the third pixel resides at the first set of X-Y coordinates within the second frame.

9. The graphics subsystem of claim 1, further comprising a shader unit coupled to the graphics subsystem that:
generates a shader sample at the first location for the first pixel, and
processes the shader sample to generate a color value for the first pixel,
wherein the first sample comprises a coverage sample.

10. A computer-implemented method for generating samples of pixel, the method comprising:
receiving a first set of X-Y coordinates associated with a first pixel of a first frame, the first set of X-Y coordinates including an X coordinate and a Y coordinate;
generating a first index into a first sample pattern table that includes a first plurality of entries based on the first set of X-Y coordinates, wherein the first index references a first subset of entries included in the first plurality of entries;
extracting the first subset of entries from the first sample pattern table; and
generating a first sample at a first location within the first pixel on an indication from a first entry included in the first subset of entries.

11. The computer-implemented method of claim 10, further comprising:
determining a frame number associated with the first frame; and
selecting the first sample pattern table from a plurality of sample pattern tables based on the frame number.

12. The computer-implemented method of claim 11, further comprising:
parsing one or more least significant bits from the X coordinate;
parsing one or more least significant bits from the Y coordinate; and
combining the one or more least significant bits from the X coordinate with the one or more least significant bits from the Y coordinate to generate the first index.

13. The computer-implemented method of claim 10, further comprising:
generating a second index into the first sample pattern table that references a second subset of entries included in the first plurality of entries; and
extracting the second subset of entries from the first sample pattern table, wherein a second entry included in the second subset of entries indicates a second location within a second pixel of the first frame where a second sample is to be generated.

14. The computer-implemented method of claim 10, further comprising:
generating a second index into a second sample pattern table that includes a second plurality of entries, wherein the second index references a second subset of entries included in the second plurality of entries; and
extracting the second subset of entries from the second sample pattern table, wherein a second entry included in the second subset of entries indicates a second location within a second pixel of a second frame where a second sample is to be generated.

15. The computer-implemented method of claim 14, wherein the second pixel resides at the first set of X-Y coordinates within the second frame.

16. The computer-implemented method of claim 10, further comprising receiving, from a software application, the plurality of sample pattern tables.

17. The computer-implemented method of claim 16, wherein the software application includes a number of sample pattern tables in the plurality of sample pattern tables that reflects a first multiframe antialiasing mode.

18. A computing device, comprising:
a graphics subsystem, including:
a first sample pattern table that includes a first plurality of entries; and
an index unit that:
receives a first set of X-Y coordinates associated with a first pixel of a first frame, the first set of X-Y coordinates including an X coordinate and a Y coordinate;
generates a first index into the first sample pattern table based on the first set of X-Y coordinates, wherein the first index references a first subset of entries included in the first plurality of entries, and
extracts the first subset of entries from the first sample pattern table, and
a rasterizer that generates a first sample at a first location within the first pixel on an indication from a first entry included in the first subset of entries.

19. The computing device of claim 18, further comprising:
a shader unit coupled to the graphics subsystem that:
generates a first shader sample for the first pixel at the first location, and
generates a first color value for the first pixel based on the first shader sample.

20. The computing device of claim 19, wherein a second pixel resides at the first set of X-Y coordinates within a second frame, and wherein the shader unit that:
generates a second shader sample for the second pixel at the second location, and generates a second color value for the second pixel based on the second shader sample.

* * * * *